Feb. 28, 1956  R. STEVENS  2,736,087
ASSEMBLING DEVICE
Filed Jan. 15, 1952  9 Sheets-Sheet 2

INVENTOR.
ROBERT STEVENS
BY
Bean, Brooks, Buckley & Bean.
ATTORNEYS

Feb. 28, 1956 R. STEVENS 2,736,087
ASSEMBLING DEVICE
Filed Jan. 15, 1952 9 Sheets-Sheet 5

INVENTOR.
ROBERT STEVENS
BY
Bean, Brooks, Buckley & Bean.
ATTORNEYS Feb. 28, 1956   R. STEVENS   2,736,087
ASSEMBLING DEVICE
Filed Jan. 15, 1952   9 Sheets-Sheet 7

INVENTOR.
ROBERT STEVENS
BY
Bean, Brooks, Buckley & Bean.
ATTORNEYS

United States Patent Office 2,736,087
Patented Feb. 28, 1956

2,736,087

ASSEMBLING DEVICE

Robert Stevens, Boston, N. Y., assignor to Wiesner-Rapp Co., Inc., Buffalo, N. Y.

Application January 15, 1952, Serial No. 266,483

5 Claims. (Cl. 29—205)

My invention relates in general to machines for assembling articles composed of a number of parts, and in particular to the assembling of segments and mica-insulators of commutators for electric motors and generators.

The principal object of my invention is to provide a machine which will automatically feed and assemble commutator sections or segments and interposed insulating mica inserts in an efficient and rapid manner.

Another object is to provide an assembling ring having a circular aperture in which the commutator segments and mica inserts are fed one pair at a time, means being provided for keeping the pairs of segments closely stacked together as they are being assembled.

A further object is to provide means for assembling the end rings and staking the same in place upon the assembled commutator to initially hold the parts in place subsequent to further treatment of the finished commutator.

Moreover my device is provided with suitable solenoid actuated clutches controlled by suitable switches for causing the actuation of the various parts of the machine in sequence.

The above objects and advantages have been accomplished by the device shown in the accompanying drawings, of which.

As hereinbefore stated, my invention is designed for assembling commutator bars and mica inserts in the manufacture of commutators for motors and generators. As is well known, each of such commutators consists essentially of a metal sleeve 20 (see Fig. 16) about which is an insulating tube 21. The copper commutator segments 22, shown in Figs. 18 and 19, and interspaced mica inserts 24 are assembled about the insulating tube and when assembled a collar 23 is placed at each end of the assembled commutator.

My device comprises a frame 25 which supports the various parts of the device. A drive shaft 26 is suitably mounted and supported in the frame and driven from a jack shaft 30 through suitable gears 31, the jack shaft being driven by means of a motor 32 and a belt 33 which passes over suitable sheaves 34 and 35. A cam drum shaft 36 is also suitably mounted in the frame and is driven from the drive shaft 26 by means of a sprocket chain 40 which passes over a sprocket wheel 41 carried by the drive shaft and also over a sprocket wheel 42 carried by the drum shaft. The sprocket wheel 41 is loosely mounted for rotation upon the shaft 26 and is coupled therewith by means of a ratchet clutch 43 clearly shown in Fig. 9 and to be hereinafter described. An assembling cam shaft 44 is also suitably mounted in the frame and is driven from the drive shaft 26 by means of a sprocket wheel 45 carried thereby, and by a sprocket chain 46 which is connected to a sprocket wheel 50 carried by the shaft 44. A ratchet clutch 51 is also provided for connecting the sprocket wheel 50 to the assembling cam shaft 44, as clearly shown in Fig. 3. The assembling cam shaft is suitably supported in spaced lateral bearing plates 52 and carries a lifter disc 53 and a pusher cam 54. The lifter disc is formed in one of its faces with a detent cam 55 having a groove 57 and in its opposite face with a lifter slide cam 56 having a groove 58 for actuating the detent fingers 60 and the lifter slide 61, respectively, to be hereinafter described. The lifter disc 53 is non-rotatably mounted upon the assembly cam shaft and is rotated therewith. This disc is therefore interrupted in its rotation with the interruption of the assembling cam shaft 44. The pusher cam 54 is formed in its face with a pusher cam groove 62 which controls the actuation of the pusher 63, to be hereinafter described.

Figures 6, 7, 14, 15:
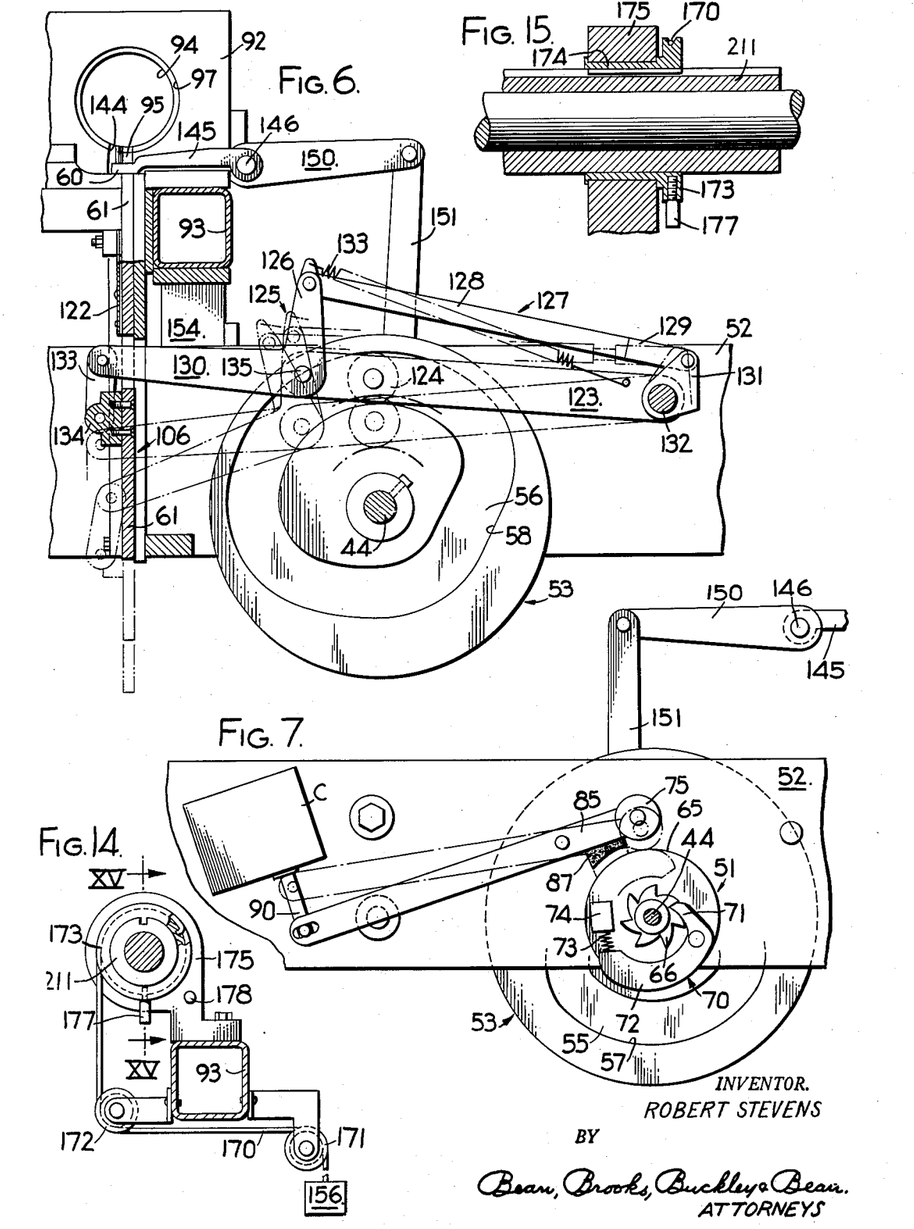
Fig. 6 is an enlarged fragmentary elevational view taken on line VI—VI of Fig. 3.
Fig. 7 is an enlarged fragmentary elevational view taken on line VII—VII of Fig. 1.
Fig. 14 is a cross sectional view taken on line XIV—XIV of Fig. 2.
Fig. 15 is an enlarged sectional view taken on line XV—XV of Fig. 14.

A clutch 64 is provided for the pusher cam 54. The assembly shaft clutch 51 and the clutch 64 are each provided with a disc 65. The disc of the pusher cam clutch is secured to the pusher cam 54, and the disc of the assembling shaft clutch is secured to the assembly shaft 44. A ratchet wheel 66 is provided for each of these clutches and each is secured to the assembly shaft. Each of the discs 65 of these clutches is provided with a bell crank ratchet pawl 70 having an arm 71 which is engageable with the teeth of the coacting ratchet wheel. An arm 72 is provided on each of the ratchet pawls. These arms extend outwardly beyond the peripheries of the discs 65 when the arms 71 of the pawls are engaged with the ratchet wheels. Each of these pawls is retained in position by means of a helical spring 73 which bears against an abutment 74 carried by the disc. An actuating roller 75 is provided for each clutch which is engageable with the periphery of the disc 65 at predetermined periods during the operation of the device. When this roller is brought into bearing contact with the periphery of the disc by means hereinafter described, and when the arm 72 of the ratchet pawl is moved around with the disc to a point of engagement with the roller, this arm will be pressed inwardly by the roller, which will cause the arm 71 of each clutch to become disengaged from the ratchet wheel and thus disconnect each clutch from the assembling cam shaft 44. The roller 75 of the pusher cam clutch 64 is carried by an arm 77 of a pivotally mounted bell crank lever 76 having an arm 78 to which is connected a solenoid link 80. The opposite end of this solenoid link is connected to an arm 79 of a solenoid bell crank 81 whose outwardly extending arm 82 is attached to the plunger 83 of a pusher cam solenoid B, to be hereinafter described. As shown in Fig. 7, the assembling cam shaft clutch is also provided with the bell crank ratchet 70 having its arm 71 engaging the ratchet wheel 66 carried by this shaft, and having its other arm 72 held in its outwardly projected position by means of the spring 73 which bears against the abutment 74 carried by the clutch disc. The roller 75 of this clutch is carried by the clutch disc. The roller 75 of this clutch is carried by a solenoid rocker arm 85 which is pivotally supported by the lateral bearing plate 52 and which has its outer end connected to the plunger member 90 of an assembling cam shaft solenoid C, to be hereinafter described.

In order to stop the rotation of the cam disc 53, the lifter cam 54, and the cam shaft 36, I provide suitable brake means. The rocker arm 85 of the assembling cam clutch is provided with a brake shoe 87 which contacts with the periphery of the clutch disc 65 when the roller 75 thereof engages the arm 72 of the ratchet pawl 70. The arm 77 of the bell crank 76 of the pusher cam clutch 64 is also formed with a brake shoe 88 for frictional contact with the disc 65 of the clutch when actuated by the solenoid B. In like manner the arm 200 of the bell crank 196 of the cam shaft clutch 43 is provided with a brake shoe 197 for frictional contact with the disc 65 of this clutch to hold the cam shaft 36 stationary during the predetermined periods of inactivity.

The commutator for which the present invention is designed comprises twenty-eight segments and twenty-eight mica inserts. These segments and inserts are fed into an assembling ring 92 which is carried by a supporting bar 93. This bar extends longitudinally of the machine and is supported by the frame thereof. The assembling ring is formed with a circular aperture or cavity 94 which is of substantially the same diameter as the assembled commutator and which is of a length sufficient to support the commutator segments. A counterbore or recess 97 is provided at one end of the aperture for the accommodation of the terminal lugs 98 of the segments. During the assembling of the commutator, the copper segments and mica inserts are fed in pairs, one pair at a time, into the aperture or cavity 94 of the ring through a suitable slot 95 formed in the lower periphery of the ring. The assembling ring is formed with a pusher slot 108 adjacent the slot 95 for the reception of the upper end of the pusher 63 which pushes each segment and insert around in the aperture of the ring as they are fed by the lifter slide to a position where the detent fingers 60 will contact the last fed segment and hold the assembled segments away from the slot 95.

Figure 1:
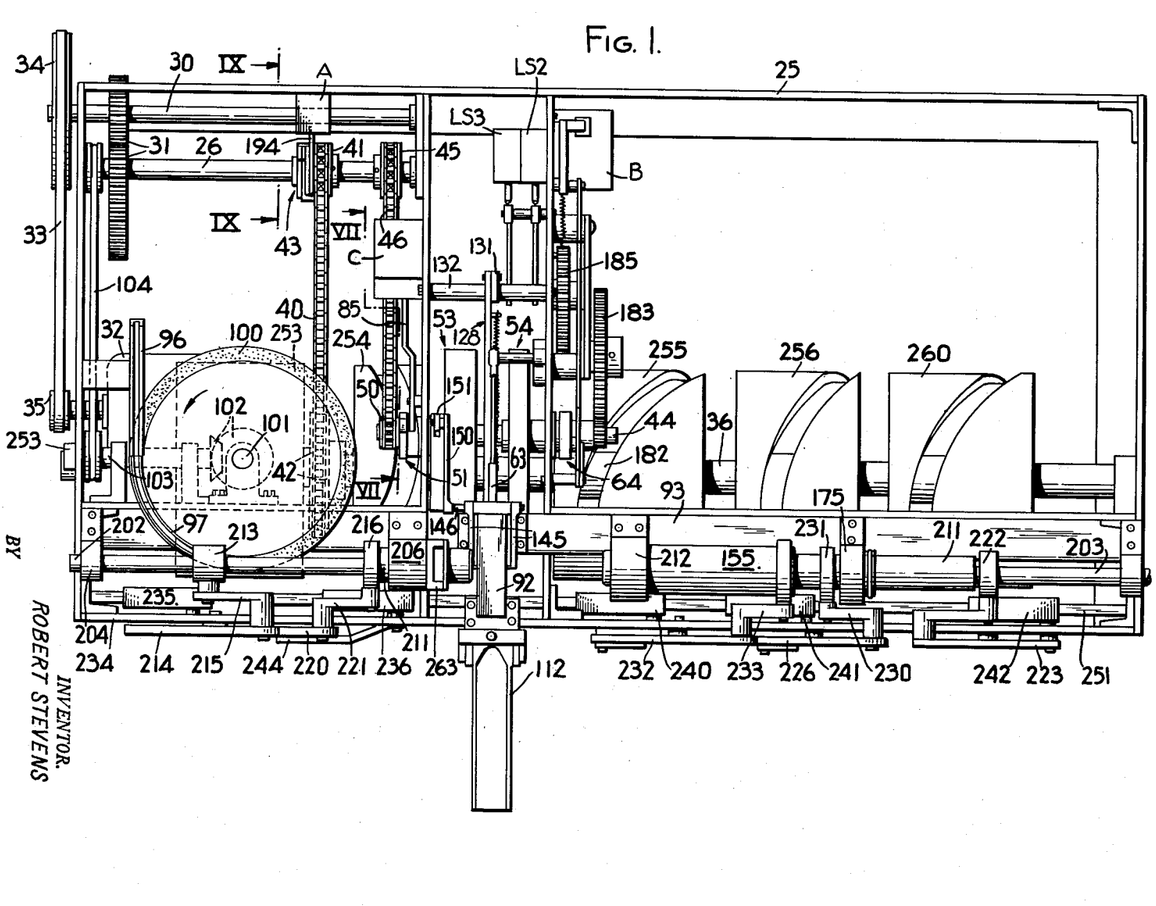
Fig. 1 is a plan view of the device.
Figures 10, 11, 12, 13:
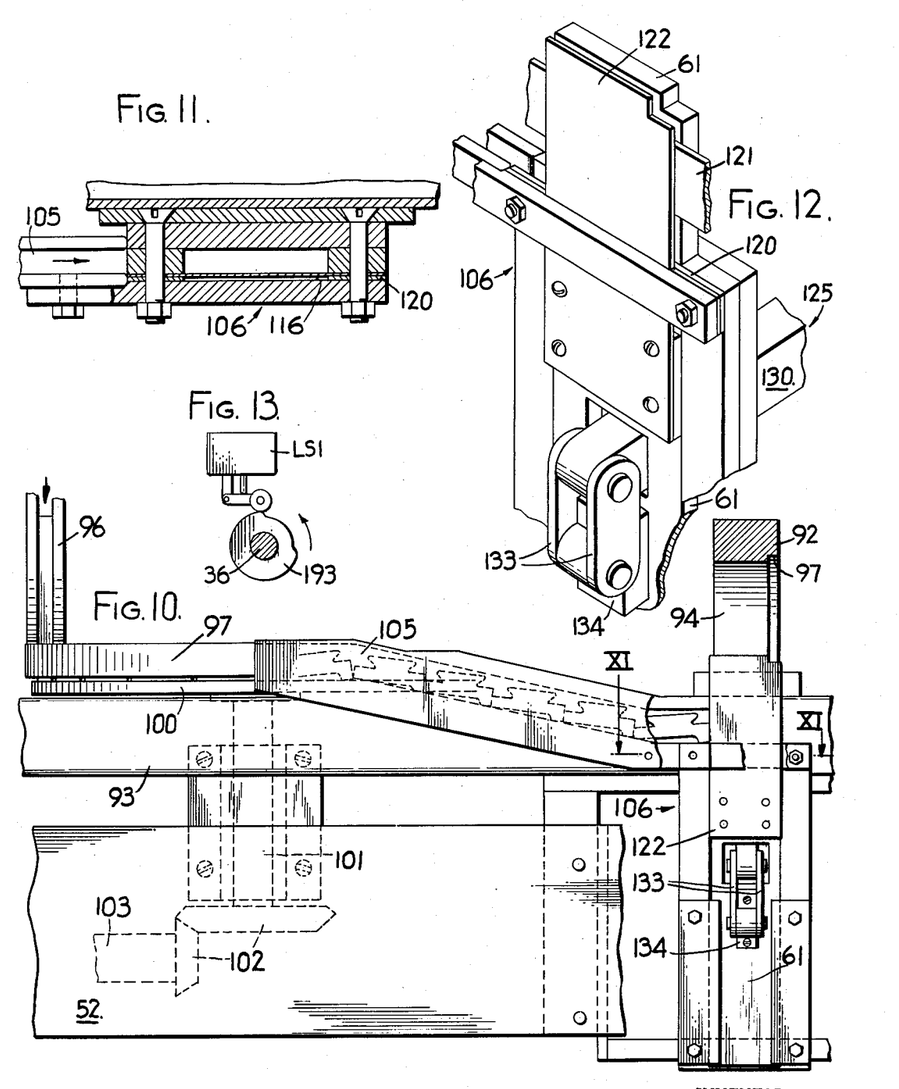
Fig. 10 is an enlarged fragmentary side elevation showing the feed chute and the lifter assembly.
Fig. 11 is an enlarged sectional plan view taken on line XI—XI of Fig. 10.
Fig. 12 is a perspective view of the lifting assembly.
Fig. 13 is a fragmentary end elevation of the cam drive shaft showing the microswitch carried thereby.

As shown in Fig. 1, the segments are delivered to the machine through a segment feeding chute 96 and are deposited upon a rotatable feed table 100. This table is mounted upon a vertical shaft 101 which is rotated by means of a beveled gearing 102, driven by means of a shaft 103 which is belted to the drive shaft 26 by means of a belt 104. A circular extension 97 of the chute 96 serves to guide the segments as they are carried around on the horizontally disposed face of the feed table 100 through an angle of substantially 90° whereupon they are deposited into an inclined feed chute 105 by means of which they are fed to a lifter assembly 106, shown clearly in Figs. 10, 11, and 12. The inserts are fed to the lifter assembly by means of an insert chute 112 which is detachably mounted upon the machine and held in position against the flange 114 by means of an index pin 113. The inserts are fed forwardly in the chute by means of a feeder block 115 which may be urged inwardly either by means of a spring or gravity. The lifter assembly is positioned below the assembly ring 92, and comprises the segment lifter slide 61 and an insert lifter slide 122 which, when reciprocated vertically, picks up one of the segments 22 and one of the inserts 24 and carries them up through the slot 95 of the assembling ring to the interior of the aperture 94 thereof. The lifter and insert slides when moved to their upper lifting positions act as stops to the next succeeding segment and insert holding them, ready to be fed into position upon the next stroke of the slide. The insert slide is kept in spaced relation with the segment slide by means of spacers 120 and 121.

The lifter slide is actuated by a lifter arm 123 pivotally supported by one of the lateral bearing plates 52. This arm is extended forwardly toward the lifter assembly and is actuated by means of a roller 124 carried near the outer end of the arm and in engagement with groove 58 of the lifter slide cam 56. To the forward end of the lifter arm there is pivotally attached a bell crank lever 125 having an upwardly extending arm 126 and a forwardly extending arm 130. The arm 126 is connected to an upwardly extending lifter lever 131, carried by the pivot shaft 132 of the lifter arm, by means of a lifter link 127. The lifter link is formed of two pieces 128 and 129 which are in telescopic arrangement as clearly shown in Figs. 5 and 6 and which are retained in their normal positions by means of a helical spring 133 which is attached to the lifter arm 123 and to the upwardly extending arm 126 of the bell crank thereby maintaining the bell crank arm 130 in substantial alignment with the lifter arm 123. The outer end of the arm 130 is attached by means of links 133 to a slide block 134 which is attached to the segment lifter slide 61. As just stated, the arm 130 of the bell crank 125 is normally maintained in alignment with the lifter arm 123. Should, however, one of the segments become jammed, the bell crank 125 will be rotated about its pivot 135 and the lifter arm 123 will therefore move up and down idly while the telescopic lifter link expands and contracts as to length against the tension of the spring 133 thereby preventing undue strain or breakage of any of the parts of the machine.

Figure 3:
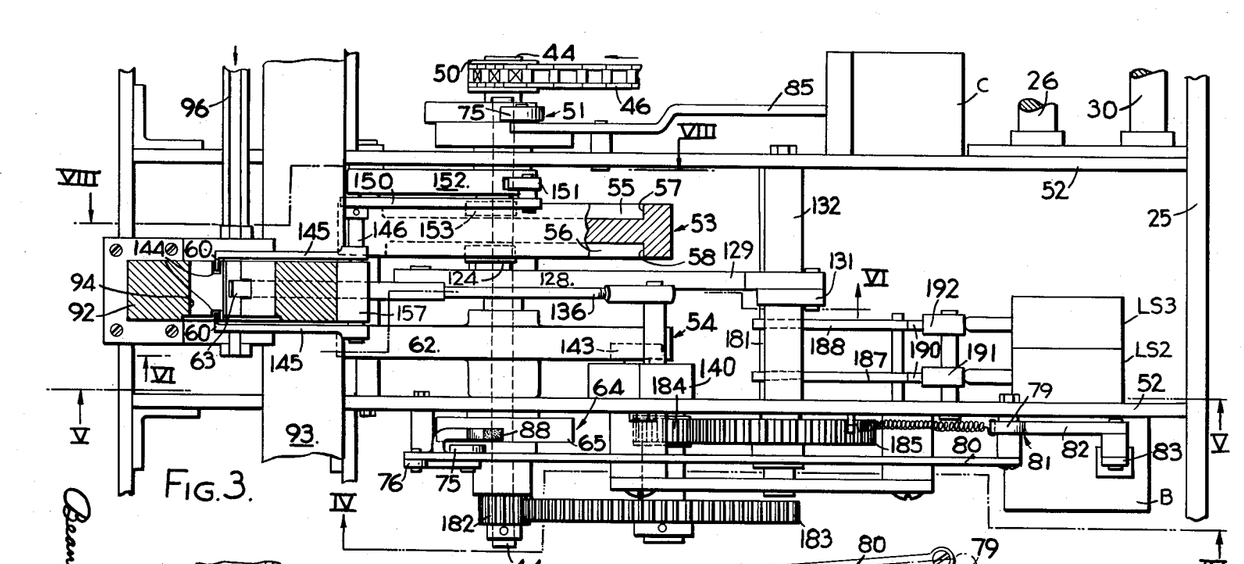
Fig. 3 is an enlarged fragmentary plan view of the assembling mechanism.
Figure 4:
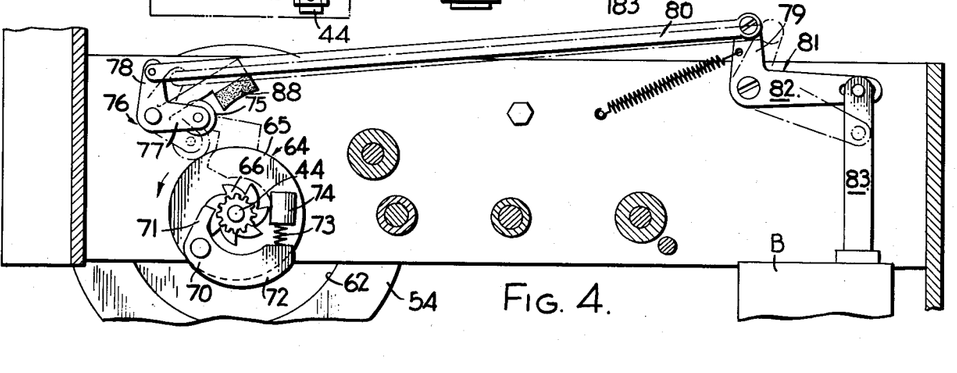
Fig. 4 is a sectional elevation of the portions of the invention shown in Fig. 3 and is taken on line IV—IV thereof.
Figure 5:
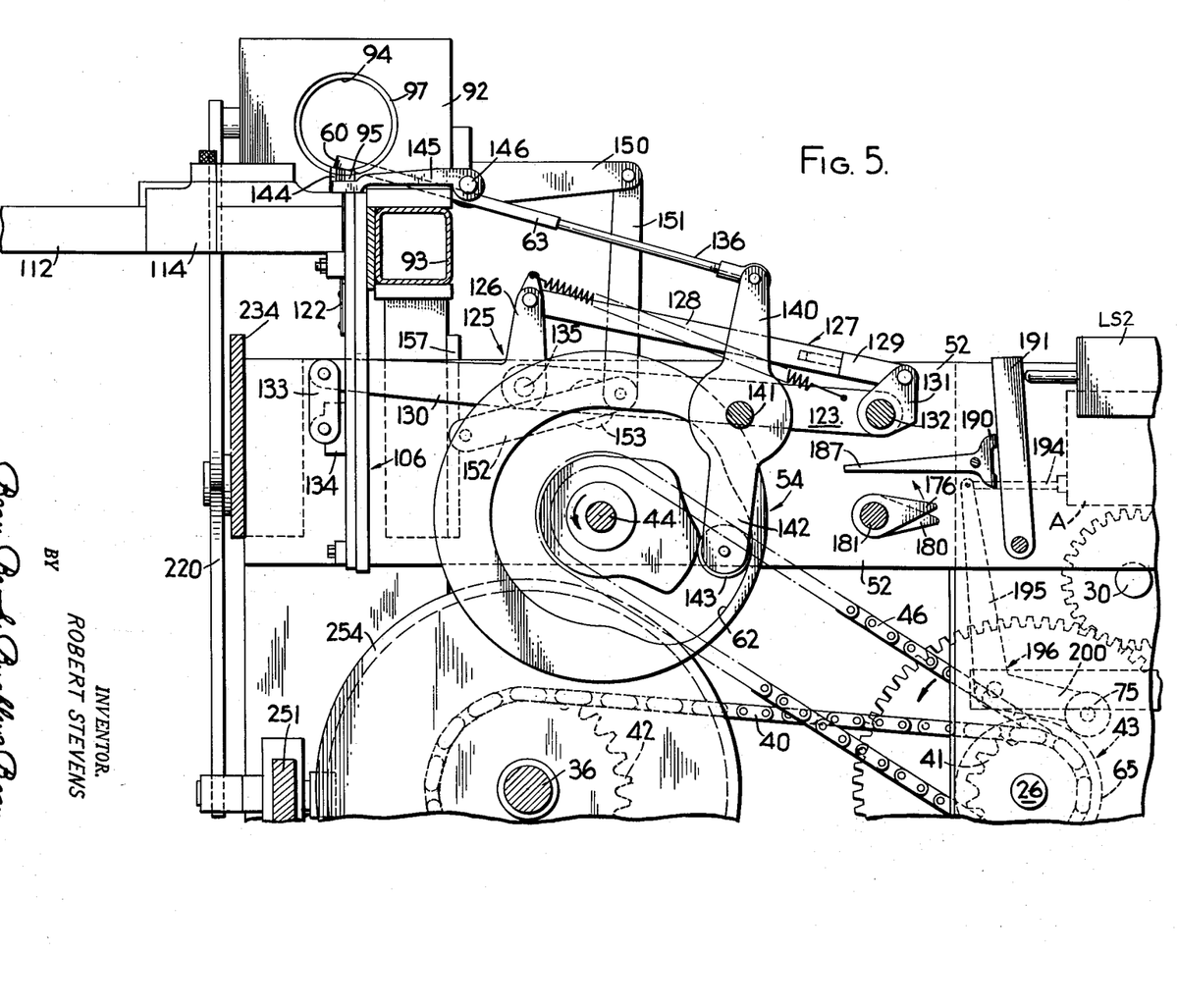
Fig. 5 is an enlarged elevation of the portions of the invention shown in Fig. 3 and is taken on line V—V of Fig. 3.
Figures 8, 9:
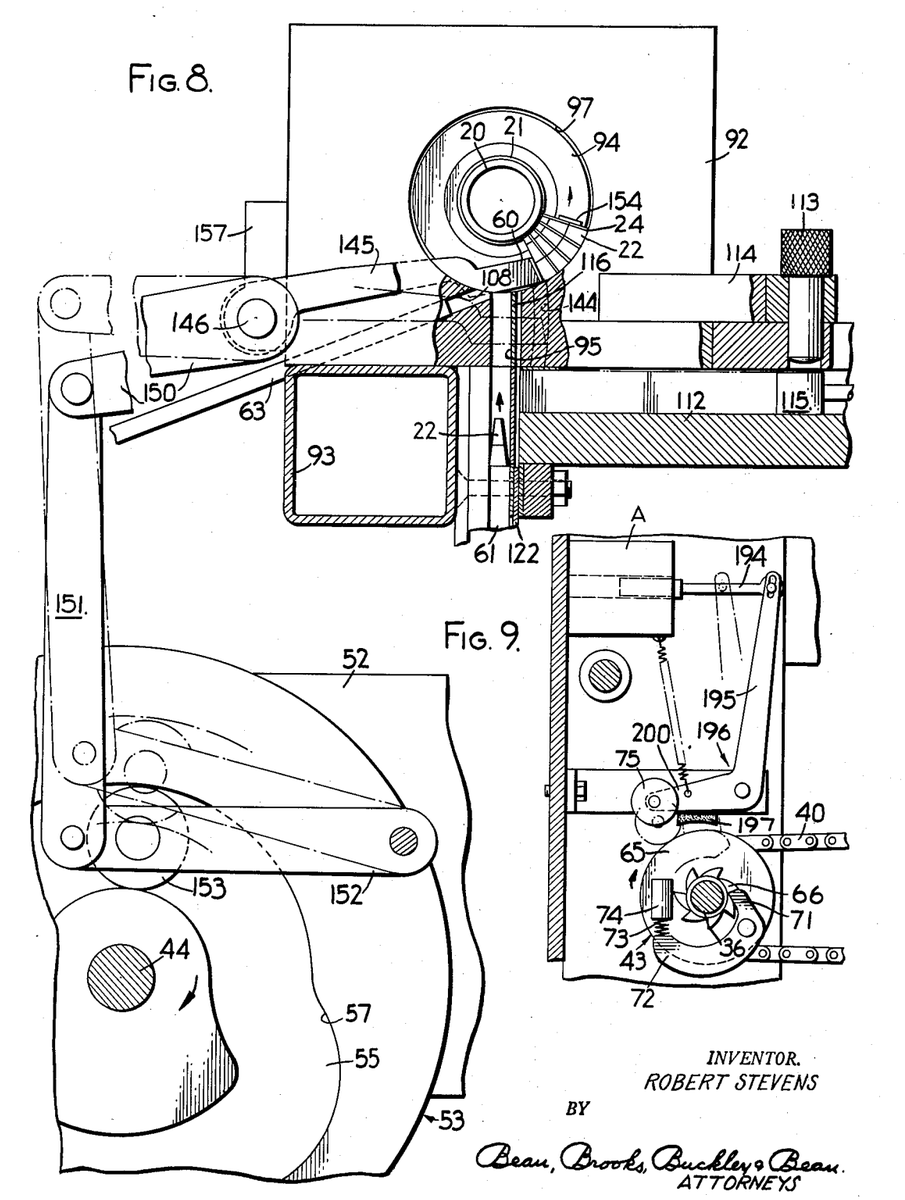
Fig. 8 is an enlarged fragmentary sectional elevation taken on line VIII—VIII of Fig. 3.
Fig. 9 is an enlarged sectional view taken on line IX—IX of Fig. 1.

As the copper and mica segments are being fed into the assembly, they must be pushed away from the slot 95 before the next segment and insert can be fed into the ring. This is accomplished by means of the pusher 63 which is reciprocated by the pusher cam and which is movable obliquely, as shown in Figs. 5 and 8, into the aperture 94 of the ring. The pusher 63 is attached to a pusher link 136 which has its outer end pivotally connected to a pusher lever 140. This lever is pivotally carried by the lateral side bearing plates 52 and is mounted upon a pivot pin 141. The lower arm 142 of this pusher lever carries a roller 143 which is in engagement with the groove 62 of the pusher cam 54. It will be noted from Fig. 5 that the cam groove 62 is so designed as to cause the reciprocating movement of the pusher to be accomplished through two stages. It is gradually moved to the place where it will contact the segment after which it is gradually actuated to push the segment to its predetermined position in the assembling ring, thereby avoiding any jarring of the workpieces as they are being assembled. When the segments have been pushed to their predetermined positions, it is necessary to retain them in such positions while the pusher is returned to its normal inactive position thus clearing the slot 95 for the feeding of the next segments. The retaining of the segments in their fed positions is accomplished by means of the detent fingers 60. These fingers have inturned ends, as shown in Fig. 3, and ride in arc-shaped slots 144 formed in the side faces of the assembling ring. These ends extend inwardly toward the center of the ring far enough to engage the ends of the segments. The fingers are carried by detent arms 145, one arranged on each side of the assembling ring. The arms are mounted upon a detent shaft 146 secured at one end to a detent arm 150. This arm is connected to a detent lever 152 by means of a detent link 151. This detent lever is provided with a detent cam roller 153, and it is pivotally secured to a bracket 157 supported by the longitudinal supporting bar 93.

In order to keep the segments and mica inserts from falling out of place and tumbling around in the aperture 94 when the pair which was first fed has reached the top of the aperture, a presser finger 154 is provided (see Figs. 8 and 16 to 20). This finger is carried by a reciprocating presser sleeve 155, to be hereinafter described. The presser sleeve with its finger is fed forwardly into the aperture of the assembling ring after the first segment and insert have been fed thereto, and the finger is maintained in yieldable pressure against the first fed segment by means of a weight 156 carried at the end of a cable 170 which passes over sheaves 171 and 172 and around a presser finger sheave 173. This sheave is carried by a sleeve 174 which is mounted within one of the bearings 175 of the device and which is keyed to the reciprocating presser sleeve 211. The sleeve 155 which carries the presser finger is keyed to the sleeve 211 and, therefore, is rotatable by means of the sheave 173. A detent pin 177 is carried by the sheave 173 and is engageable with a stop pin 178 mounted upon the bearing 175. The detent pin is urged toward the stop pin by means of the weight 156; and, when these pins are in contact with each other, the presser finger 154 will be moved in front of the first fed segment and insert by the reciprocation of the presser sleeve 155 where it will yieldably press against the segments and inserts as they are being assembled within the ring. The finger which is yieldably held in contact with the first fed segment and insert remains in this position until the twenty-seventh segment has been fed to the assembling ring, whereupon it is withdrawn, thus leaving space between the first and the twenty-seventh segment and insert for the insertion of the twenty-eighth segment and mica insert.

As hereinbefore stated, the lifter slide 61 and detent fingers 60 are controlled by means of a clutch 51, and the pusher 63 is controlled by means of a clutch 64. These clutches which control the operation of their respective cams are actuated, respectively, by means of the solenoids C and B, hereinbefore described. These solenoids are energized from a suitable source of electric energy through microswitches LS2 and LS3 which are carried by one of the bearing plates 52. The pusher cam 54 is controlled by the switch LS2 which is connected to solenoid B, and the lifter disc 53 carrying the lifter and detent cams is controlled through the medium of the microswitch LS3 and the assembling cam solenoid C. The microswitches LS2 and LS3 are actuated, respectively, by switch arms 176 and 180 which are mounted upon a switch arm shaft 181. This shaft is pivotally supported by the lateral bearing plates 52 and is rotated through the medium of a gear train comprising a drive pinion 182 mounted upon the assembly cam shaft 44, an idler gear 183 pivotally supported by the plate 52, an idler gear pinion 184 carried by the hub of the idler gear 183, and a switch arm shaft gear 185 carried by the switch arm shaft 181. The gear reduction is such that the switch arm shaft makes one revolution while the assembling cam shaft 44 makes a number of revolutions equal to the number of segments in the commutator. The switch arms 176 and 180 are engageable, respectively, with pivotally mounted rocker arms 187 and 188. As clearly shown in Fig. 5, the switch arms are so mounted on the shaft 181 that the rocker arm 187 will be actuated after the second last segment has been fed into the assembling ring and the rocker arm 188 only after the last segment has been fed thereto. Each of the rocker arms is in the nature of a bell crank having an upwardly extending arm 190 each of which engages, respectively, with a switch lever 191 and 192. These levers actuate, respectively, the microswitches LS2 and LS3. As hereinbefore stated, when the twenty-seventh, or second last segment and insert has been fed to the assembly ring, the pusher is no longer needed and at this time the switch arm 176 will contact its cooperating rocker arm 187, thus closing the normally open contacts of microswitch LS2 and causing the pusher cam solenoid B to be energized. With the energization of this solenoid, the roller 75 of the bell crank 76 will be pressed downwardly onto the disc 65 and will contact the ratchet pawl of the pusher cam shaft clutch, thereby disengaging the cam from the rotating assembling cam shaft and applying the brake shoe 88 to the disc 65, thereby quickly stopping the action of the pusher. The lifter disc 53 having the lifter and the detent cams will continue to rotate for one more revolution, thereby feeding the twenty-eighth or last segment and insert into the assembling ring and thus completing the assembling of the commutator segments and inserts. With the feeding of the last segment and insert, the switch arm 180 will contact its cooperating arm 188, and cause the normally open microswitch LS3 to be closed, which will deenergize the assembling cam shaft solenoid C, causing the roller 75 carried by the rocker arm 85 of the assembling cam shaft clutch 51 to engage the disc of the clutch and thereby disengage the pawl from the ratchet wheel and apply the brake shoe 87 to the disc thereby interrupting the rotation of this disc.

A normally closed microswitch LS1 (Fig. 13) is controlled by the cam shaft 36 and it is actuated by a cam 193 mounted upon this shaft. This microswitch controls the actuation of a cam shaft solenoid A and serves through the cam shaft clutch 43 to alternately engage and disengage the cam shaft 36. The solenoid A has its plunger 194 connected to the upper arm 195 of a bell crank lever 196. This bell crank lever has an outwardly extending arm 200 to which a roller 75 is attached. During the assembling of the commutator segments and inserts the roller is normally held in contact with the ratchet pawl of the cam shaft clutch 43, thereby disengaging the same from the ratchet wheel 66 and stopping the rotation of the cam shaft 36. When, however, the contacts of the microswitch LS3 are again closed, the cam shaft solenoid A will be de-energized, thereby moving the roller away from the periphery of the clutch disc and allowing the ratchet pawl thereof to engage the ratchet wheel 66 and cause the cam drum shaft 36 to be rotated.

In order to feed the various component parts of the commutator before and after the segments and inserts thereof have been assembled, I provide a reciprocating pilot rod 202 at the lefthand side of the assembling ring (as viewed in Fig. 2) and a reciprocating pilot rod 203 at the righthand side of the ring. The rod 202 is supported at its outer end by means of a bearing 204, and its forward end is surrounded by a collar sleeve 205 which is slidably supported by means of a bearing 206. The pilot rod 203 is slidably supported at one end by a bearing 210 and slidably mounted thereon is a collar sleeve 211, about which is slidably disposed the presser sleeve 155. The presser sleeve and its coacting parts are supported at the outer end by means of a bearing 212. The collar sleeve 211 is also slidably supported by means of the bearing 175, which together with the other bearing just mentioned are carried by the supporting bar 93. The pilot rod 202 carries a fixed collar 213 which is attached to the upper end of a pilot rod lever 214 by means of a link 215. The collar sleeve 205 has a collar 216 rigidly secured thereto which is connected to the outer end of a collar lever 220 by means of a link 221. The pilot rod 203 carries a fixed collar 222 which is connected to the upper end of a pilot rod lever 223 by means of a link 224. The collar sleeve 211 has a collar 225 fixed thereon which is connected to the upper end of a collar lever 226 by means of a link 230. The presser sleeve 155 has a collar 231 fixed thereon, and this collar is connected to the upper end of a presser lever 232 by means of a link 233. The levers 214, 220, 232, 226, and 223 are all pivotally supported by a pivot plate 234 which is secured to the frame of the machine. The above mentioned levers have their lower ends connected, respectively, to lever blocks 235, 236 240, 241, and 242 by means of links 243, 244, 245, 246, and 250, respectively. These blocks are slidably mounted upon a slide bar 251 and each of them carries a cam roller 252 on its inner face. The rollers carried by the blocks 235, 236, 240, 241, and 242 are engaged, respectively, with the grooves of a pilot cam 253, a collar cam 254, a presser cam 255, a collar cam 256, and a pilot cam 260. These cams are all nonrotatably mounted upon the cam shaft 36 and are actuated thereby.

Figure 2:
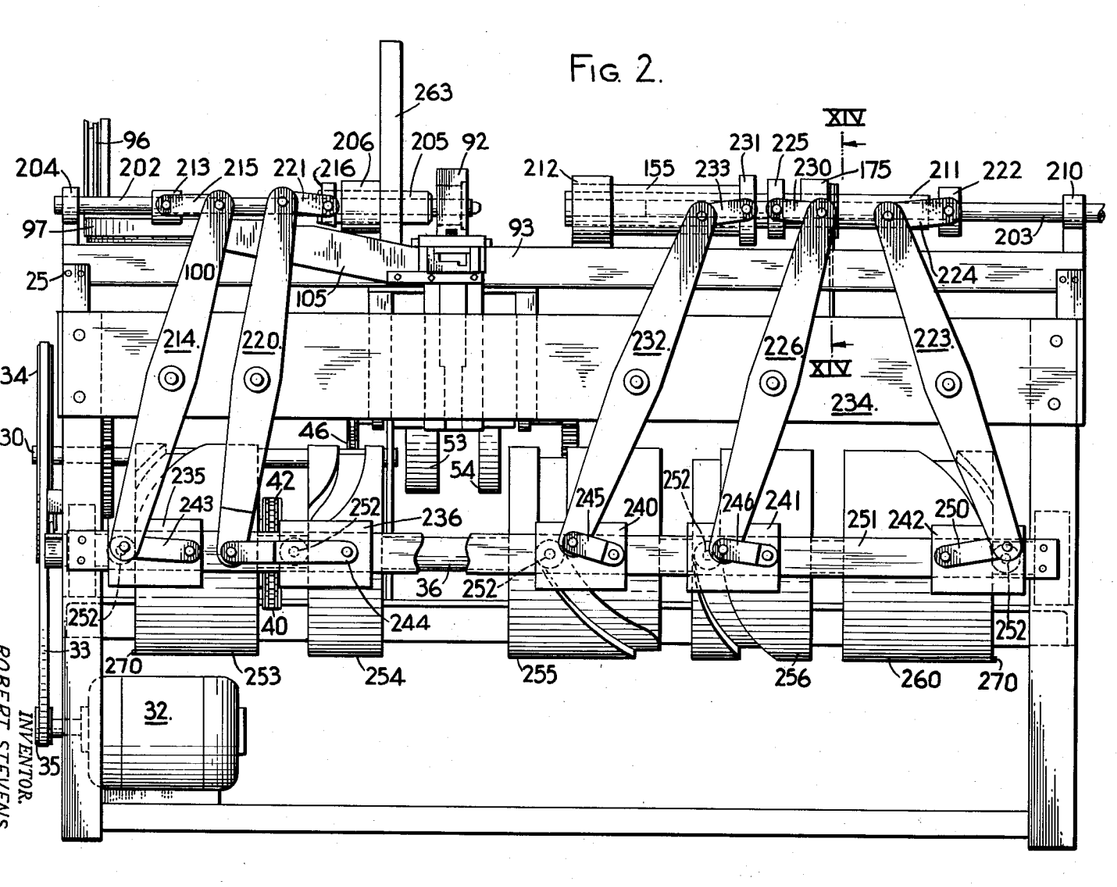
Fig. 2 is a front elevation thereof.
Figure 16:
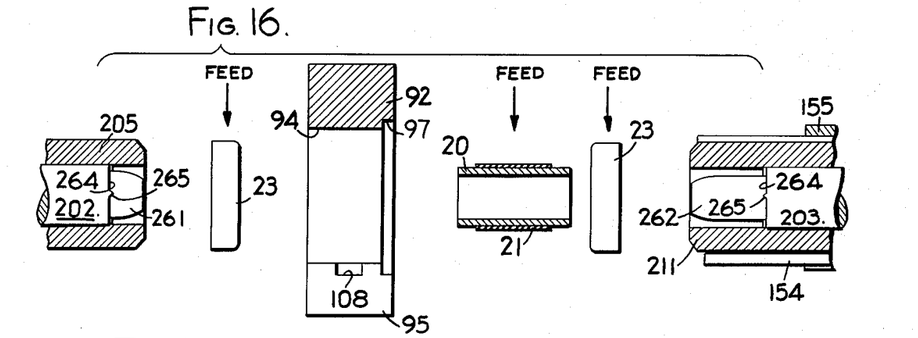
Fig. 16 is an exploded view showing the various parts in the initial relationship when the assembling operation is to be started.
Figures 17, 18, 19, 20, 21:
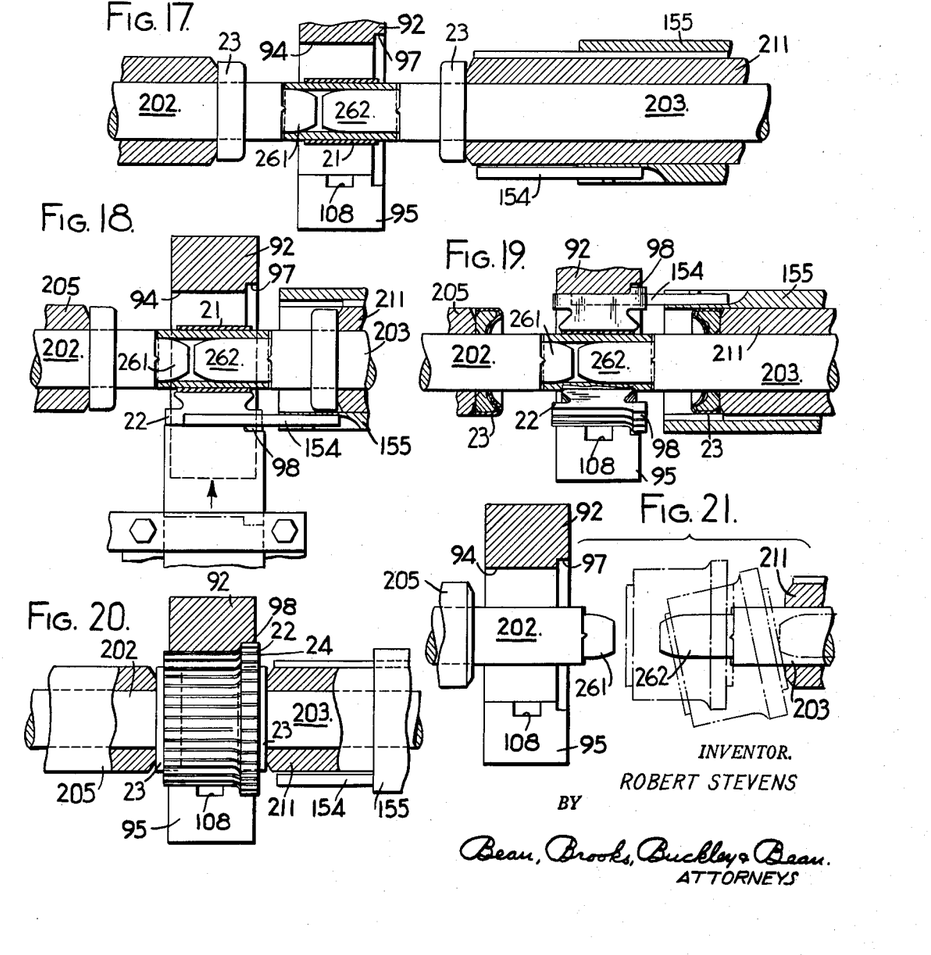
Fig. 17 is a fragmentary sectional view showing another position of the various parts in which the commutator sleeve is held in position within the assembling ring ready to receive the segments.
Fig. 18 is a view similar to Fig. 17 showing one of the segment units in place within the assembling ring and the pressure finger in position.
Fig. 19 is a similar view showing the assembling ring with a commutator partly assembled.
Fig. 20 is a similar view showing a completely assembled commutator with the staking tools in operative position.
Fig. 21 is a similar view showing the relation of the parts when the finished product is ready to be discharged from the device.

As shown in Fig. 2, the pilot rod 202 occupies substantially the same position as that shown in Fig. 21, in which position the finished commutator is ready to be ejected. However, before the segment assembling operation is started, the cams have been actuated to bring the reciprocating rods 202 and 203 and sleeves 205, 211, and 155 to the positions shown in Fig. 16. From this position, the cams actuate the respective rods and sleeves to the positions shown in Fig. 17. In the movement of the parts from the positions of Fig. 16 to those of Fig. 17, the pilot rods 202 and 203 each passes through and picks up one of the commutator collars 23 which remain spaced from the assembling ring and which rest against the ends of the collar sleeves 205 and 211. The pilot rod 202 is formed at its forward end with a pilot 261, and the rod 203 is formed with a pilot 262. Each of these pilots are of reduced diameter and serve to engage and centralize the commutator sleeve 20. The commutator collars 23, and the sleeves 20 are periodically fed from suitable magazines, for clearness of illustration only one being shown at 263. The commutator sleeves are fed from the righthand side of the assembling ring, as shown in Fig. 16, and, therefore, the pilot 262 first engages the sleeve 20. This pilot, which is longer than the pilot 261, supports and carries the sleeve to a position where its opposite end is engaged by the pilot 261 whereupon the sleeve will occupy a central position within the assembling ring 92. Because the pilot 261 is short, it cannot support the sleeve 20 and assembled segments alone, and, therefore, it releases the finished workpiece to the sole support of the pilot 262, as shown in Fig. 21, where it is being ejected. The shoulder 264 formed on each of the pilot rods is provided with projections 265 which serve to cause indentations in the ends of the commutator sleeve when the commutator is completely assembled, thereby staking the commutator collars 23 in place.

While the commutator sleeve is held in the position shown in Fig. 17, the presser sleeve 155 is actuated to move the presser finger 154 into its operating position within the aperture 94 of the assembling ring, after which the segments and inserts are fed to the ring in the manner hereinbefore described. Before the last segment and insert have been placed within the assembling ring by the respective lifter slides, the actuation of the pusher 63 is interrupted, and the presser finger 154 is withdrawn from the ring. The last segment and insert are now fed to the ring whereupon the actuation of the lifter slides is interrupted. The collar sleeve 205 and 211 are now actuated to move the collars 23 inwardly over the projecting ends of the commutator sleeve and into engagement with the dovetailed ends of the segments and inserts. When these collars have been forced tightly into position, the projections 265 of the pilot rods are given a quick reciprocating movement which causes the collars to be staked in position. The staking movement is brought about by means of a staking boss 270 formed one on each of the pilot cams 253 and 260. The pilot rods are now moved to the positions shown in Fig. 21 where the finished workpiece will be released and dropped out of the machine.

Figure 22:
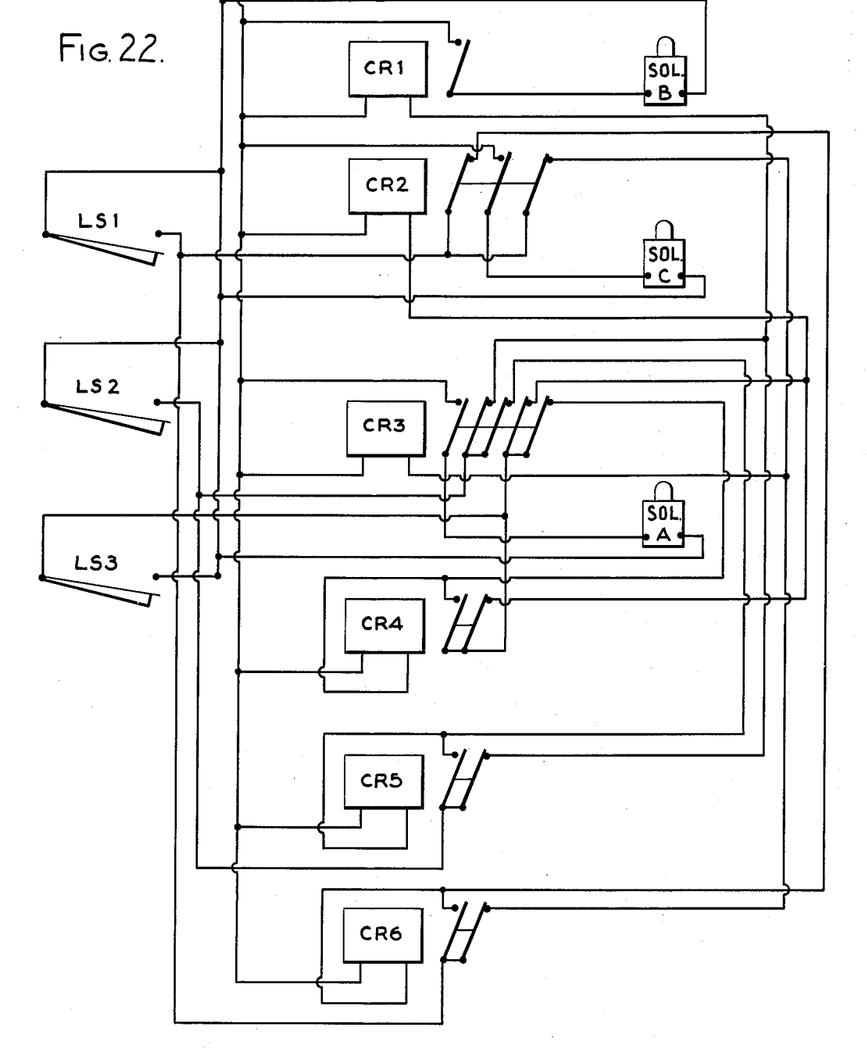
Fig. 22 is a line diagram of the preferred electrical controls and circuits employed in carrying out my invention.

As shown in Fig. 22, the solenoids A, B, and C are energized by current relays CR3, CR1, and CR2, respectively. Furthermore, in order to hold the circuits of the current relays, just mentioned, open while certain of the parts of the machine are returned to their normal positions through a predetermined cycle, interlocking current relays CR4, CR5, and CR6 are provided, as clearly shown in the electrical diagram which is a preferred layout of circuits for controlling my device. The circuits of the diagram are such as exist when the parts of the machine are in the positions shown in Fig. 17, except that LS1 on the cam shaft 36 will have been moved to its closed position which will cause relay CR3 to be energized which in turn will energize solenoid A, disconnecting the clutch of the cam shaft 36 and holding the cam shaft in inoperative position. When relay CR3 is energized, CR6 will also be energized through a normally closed contact on CR2 and will be interlocked in its closed position thereby holding closed the circuit through CR3. Relay CR3 has a number of normally closed contacts, two of which control the flow of current through relay CR1 and CR2 when LS2 and LS3, respectively, are closed. Therefore, with the energization of CR3, these normally closed contacts of CR3 are opened, thereby causing the de-energization of CR1 and CR2, and the respective solenoids B and C. The respective clutches 64 and 51, controlling the cam disc and pusher cam are therefore engaged and segments are then fed to the assembling ring 92. As hereinbefore described, when the twenty-seventh segment of the illustrative commutator has been fed to the ring, switch LS2 closes. This energizes CR1 through a normally closed contact on CR5, energizing CR1 and closing its normally open contact, thus energizing solenoid B and disengaging the clutch which drives pusher cam 54. After the twenty-eighth segment has been fed to the assembly ring, LS3 is closed which causes CR2 to be energized through the normally closed contacts on relay CR4. Relay CR2 has a normally closed contact in series with relay CR3, which when opened by the energization of CR2 causes CR3 to be de-energized. When CR3 is de-energized, solenoid A is also de-energized. Since switches LS2 and LS3 are held closed when the switch arms are stopped, relays CR4 and CR5 will be energized and hold open the circuits through CR1 and CR2, until such time as the switches LS2 and LS3 have been allowed to move to their normally open positions, whereupon relays CR4 and CR5 will be de-energized and their contacts returned to normal positions. When CR3 is de-energized, solenoid A is released and cam shaft clutch 43 is engaged, as hereinbefore stated, but LS1 is still closed which holds CR6 energized, which in turn holds open the circuit through CR3 and permits the cam shaft to make one revolution which will cause the finished workpiece to e discharged and the reciprocating sleeve and commutator parts to be fed to the position of Fig. 17, whereupon a new cycle may be started. During this revolution of the cam shaft, LS1 is opened which de-energized CR6 and reestablishes the circuit through CR3 so that when LS1 is again closed CR3 will be energized to interrupt the rotation of cam shaft 36 and permit the assembly of the commutator segments and inserts, as hereinbefore described.

What I claim is:

1. A device for assembling the segments of commutators having a commutator sleeve and two end collars, comprising an assembling ring formed with a circular cavity, a slidably mounted pilot rod disposed on each side of the ring and movable toward and away from the same, a pilot formed on each pilot rod for engagement with the ends of the commutator sleeve, lifter means for feeding segments into the cavity, a lifter cam for periodically operating the lifter means in intermittent manner, pusher means for moving each segment around in the cavity, a pusher cam for periodically operating the pusher means in intermittent manner, pusher clutch means for actuating the pusher cam and for interrupting the same when all segments but the last one have been fed to the ring, detent means for temporarily retaining the assembled segment and insert in the initially assembled positions lifter clutch means for actuating the lifter means and for interrupting the same when the last segment has been fed to the ring, a collar sleeve slidably mounted upon each rod and movable toward and away from each other for feeding the collars to said commutator sleeve, one of the collar sleeves cooperating with the rods for ejecting the assembled commutator, a presser sleeve slidably mounted upon one of the collar sleeves and movable toward and away from the ring, a presser finger carried by the presser sleeve and engageable with the advance side of the first fed segment for maintaining the segments compacted while being assembled, a cam shaft carried by the device, a pilot rod cam for each pilot rod, a collar cam for each collar sleeve, a presser cam for the presser sleeve, said cams being fixedly mounted upon the cam shaft, means connecting the pilot rod cams with the pilot rods, means connecting the collar cams with the collar sleeves, means connecting the presser cam with the presser sleeve, and clutch means for periodically connecting the cam shaft with a suitable source of power.

2. A device for assembling the segments of commutators having a commutator sleeve and two end collars, comprising an assembling ring formed with a circular cavity, a slidably mounted pilot rod disposed on each side of the ring and movable toward and away from the same, a pilot formed on each pilot rod for engagement with the ends of the commutator sleeve, lifter means for feeding segments into the cavity, a lifter cam for periodically operating the lifter means in intermittent manner, pusher means for moving each segment around in the cavity, a pusher cam for periodically operating the pusher means in intermittent manner, pusher clutch means for actuating the pusher cam and for interrupting the same when all segments but the last one have been fed to the ring, detent means for temporarily retaining the assembled segment and insert in the initially assembled positions lifter clutch means for actuating the lifter means and for interrupting the same when the last segment has been fed to the ring, staking teeth formed on the pilots, a collar sleeve slidably mounted upon each rod and movable toward and away from each other for feeding the collars to said commutator sleeve, one of the collar sleeves cooperating with the rods for ejecting the assembled commutator, a presser sleeve slidably mounted upon one of the collar sleeves and movable toward and away from the ring, a presser finger carried by the presser sleeve and engageable with the advance side of the first fed segment for maintaining the segments compacted while being assembled, a cam shaft carried by the device, a pilot rod cam for each pilot rod, each pilot cam being formed with a staking lug for staking the ends of the commutator sleeve, a collar cam for each collar sleeve, a presser cam for the presser sleeve, said cams being fixedly mounted upon the cam shaft, means connecting the pilot rod cams with the pilot rods, means connecting the collar cams with the collar sleeves, means connecting the presser cam with the presser sleeve, and clutch means for periodically connecting the cam shaft with a suitable source of power.

3. In a device for assembling commutator segments, an assembling ring formed with a circular cavity and a radial slot extending downwardly therefrom, means for successively placing individual segments within the cavity of said ring comprising lifter means for feeding said segments into the cavity through said slot, means for periodically operating said lifter means in intermittent manner, pusher means for moving each segment around in the cavity after it is fed thereto, means for periodically operating the pusher means in intermittent manner, detent means for temporarily retaining each assembled segment in its initial assembled position, a rotatable presser sleeve slidably mounted adjacent said ring, a presser finger carried by the presser sleeve and engageable with the advance side of the first fed segment for maintaining the segments compacted while being assembled, means for maintaining said presser finger in contact with said first fed segment until the last segment is ready to be fed to said ring.

4. In a device for assembling commutator segments, an assembling ring formed with a circular cavity and a radial slot extending downwardly therefrom, means for successively placing individual segments within the cavity of said ring comprising lifter means for feeding said segments into the cavity through said slot, means for periodically operating said lifter means in intermittent manner, pusher means slidably mounted in said ring for moving each segment around in the cavity after it is fed thereto, means for periodically operating the pusher means in intermittent manner, detent means having inwardly projecting fingers movable in timed relation in slots formed in said ring for temporarily retaining each assembled segment in its initial assembled position, a rotatable presser sleeve slidably mounted adjacent said ring, a presser finger carried by the presser sleeve and movable into the cavity of said ring and engageable with the advance side of the first fed segment for maintaining the segments compacted while being assembled, means for maintaining said presser finger in contact with said first fed segment until the last segment is ready to be fed to said ring.

5. A device for assembling the segments of commutators having a commutator sleeve and two end collars, comprising an assembling ring formed with a circular cavity, a slidably mounted pilot rod disposed on each side of the ring and movable toward and away from the same, a pilot formed on each pilot rod for engagement with the ends of the commutator sleeve, lifter means for feeding segments into the cavity, a lifter cam for periodically operating the lifter means in intermittent manner, pusher means for moving each segment around in the cavity, a pusher cam for periodically operating the pusher means in intermittent manner, pusher clutch means for actuating the pusher cam and for interrupting the same when all segments but the last one have been fed to the ring, detent means for temporarily retaining the assembled segment and insert in the initially assembled positions, lifter clutch means for actuating the lifter means and for interrupting the same when the last segment has been fed to the ring, a collar sleeve slidably mounted upon each rod and movable toward and away from each other, a presser sleeve slidably mounted upon one of the collar sleeves and movable toward and away from the ring, a presser finger carried by the presser sleeve and engageable with the advance side of the first fed segment for maintaining the segments compacted while being assembled, a cam shaft carried by the device, a pilot rod cam for each pilot rod, a collar cam for each collar sleeve, a presser cam for the presser sleeve, said cams being fixedly mounted upon the cam shaft, means connecting the pilot rod cams with the pilot rods, means connecting the collar cams with the collar sleeves, means connecting the presser cam with the presser sleeve, and clutch means for periodically connecting the cam shaft with a suitable source of power.

References Cited in the file of this patent

UNITED STATES PATENTS

| | | |
|---|---|---|
| 1,214,960 | Schimmelfeng | Feb. 6, 1917 |
| 1,759,500 | Frederick | May 20, 1930 |
| 1,979,434 | Baker et al. | Nov. 6, 1934 |
| 2,057,692 | Rehnberg | Oct. 20, 1936 |
| 2,324,925 | Hallowell | July 30, 1943 |
| 2,394,955 | Weber | Feb. 12, 1946 |